United States Patent [19]

Johansson

[11] 4,058,329

[45] Nov. 15, 1977

[54] CONNECTING PIECE FOR MOUNTING A VENTILATION ELEMENT IN AN OPENING IN A CEILING OR WALL

[75] Inventor: Leif Johansson, Ganglaten, Sweden

[73] Assignee: Aktiebolaget Svenska Flaktfabriken, Nacka, Sweden

[21] Appl. No.: 693,763

[22] Filed: June 8, 1976

[30] Foreign Application Priority Data

June 16, 1975 Sweden .................................. 7506894

[51] Int. Cl.$^2$ ............................................. F16L 41/00
[52] U.S. Cl. ................................... 285/162; 285/209; 285/424
[58] Field of Search ............... 285/205, 206, 207, 208, 285/209, 210, DIG. 22, 424, 189, 319, 162

[56] References Cited

U.S. PATENT DOCUMENTS

| 564,251 | 7/1896 | Long | 285/210 X |
|---|---|---|---|
| 608,174 | 8/1898 | Byrnes | 285/210 |
| 757,641 | 4/1904 | Saunders | 285/210 |
| 1,215,595 | 2/1917 | Weikert et al. | 285/DIG. 22 |
| 1,830,250 | 11/1931 | Tiefenbacher | 285/162 |
| 3,138,660 | 6/1964 | Cejka | 285/209 |
| 3,221,572 | 12/1965 | Swick | 285/209 X |

*Primary Examiner*—Thomas F. Callaghan
*Attorney, Agent, or Firm*—Dorfman, Herrell and Skillman

[57] ABSTRACT

A ventilation element for example a valve is anchored in an opening in a ceiling or wall of limited thickness by means of a connecting piece in form of a cylindric pipe with a stop flange and equipped with a plurality of elongated, narrow wings of a resilient material and tangentially projecting from the shell surface and arranged to be pressed towards said surface momentarily during the insertion by a screwing motion of said pipe and then — after final insertion — said wings extending radially along one border line against the rear side of said ceiling or wall.

8 Claims, 4 Drawing Figures

CONNECTING PIECE FOR MOUNTING A VENTILATION ELEMENT IN AN OPENING IN A CEILING OR WALL

In ventilation engineering it is often necessary that one man rapidly and safely can mount a connecting piece detachably in an opening in ceiling or wall slabs of different thicknesses or in slabs with non-uniform thickness along the edges of the opening. Normally the rear side of the slab is not at the same time as the front side accessible to the fitter. The invention subject matter, which has the object of solving the aforesaid problem, relates therefore to a new and improved design of a connecting piece for mounting a ventilation element, for example a valve and a connected ventilation passage, in an opening in a ceiling or wall slab, which connecting piece comprises a cylindric pipe provided with a stop member, for example a flange, on the front side of the connecting piece, intended to abut the ceiling or wall plane, and clamp means intended in co-operation with the stop member (flange) to detachably secure the connecting piece in the ceiling or wall opening.

The essential characterizing feature of the connecting piece according to the invention is that the clamp means comprises a plurality of elongated and narrow upright wings of a resilient material which tangentially project from the shell surface of the connecting piece and are manufactured so thin, that upon the insertion of the connecting piece into the opening, for example by a screwing motion, the wings can be brought to join closely to the shell surface of the connecting piece, and that each wing is so designed and attached to the connecting piece that the distance between the ceiling or wall plane through the stop member and the wing portion facing toward the stop member increases with the distance from the point of mounting, whereby the wings after their passage through the opening with their edge lines facing toward the stop member due to their resilience will be straightened to abut the plane on the rear side of the opening and thereby together with the stop member due to the greater or smaller outward spring action of each wing secure the connecting piece on ceiling or wall slabs of different thicknesses.

An advantageous embodiment of the connecting piece is characterized in that the wings are manufactured as substantially triangular upright tongues, which at the base of the triangle are attached to the shell surface of the connecting piece.

The invention is described in greater detail in the following, with reference to the accompanying drawing showing by way of example an embodiment of the connecting piece.

Figure 1:
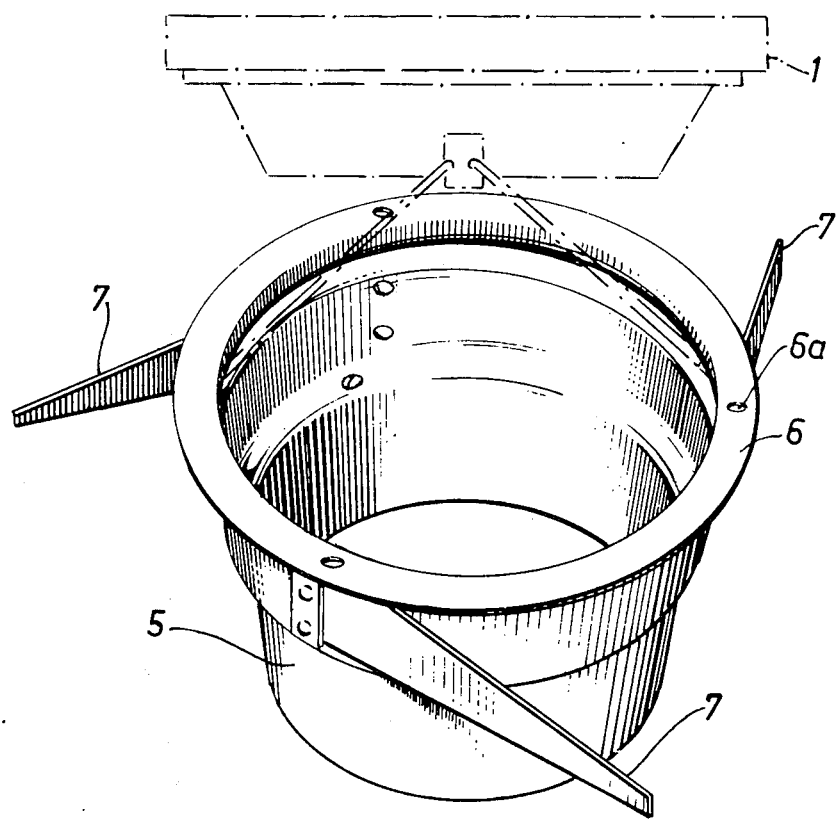
FIG. 1 is a perspective view of the connecting piece with a valve inserted in the front side thereof.
Figure 2:
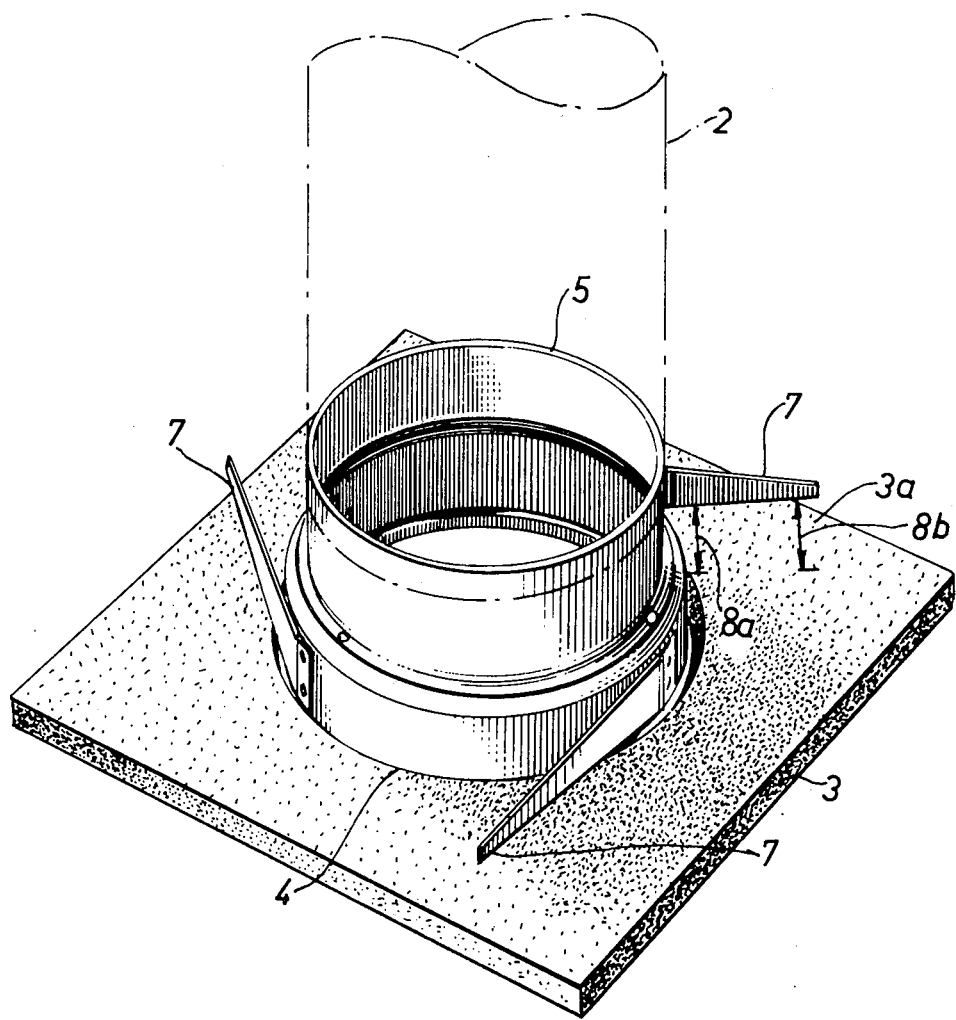
FIG. 2 is a perspective view of the connecting piece after its mounting in a slab constituting a ceiling or wall of a room, with a ventilation passage connected about the rear side of the connecting piece.
Figure 3:
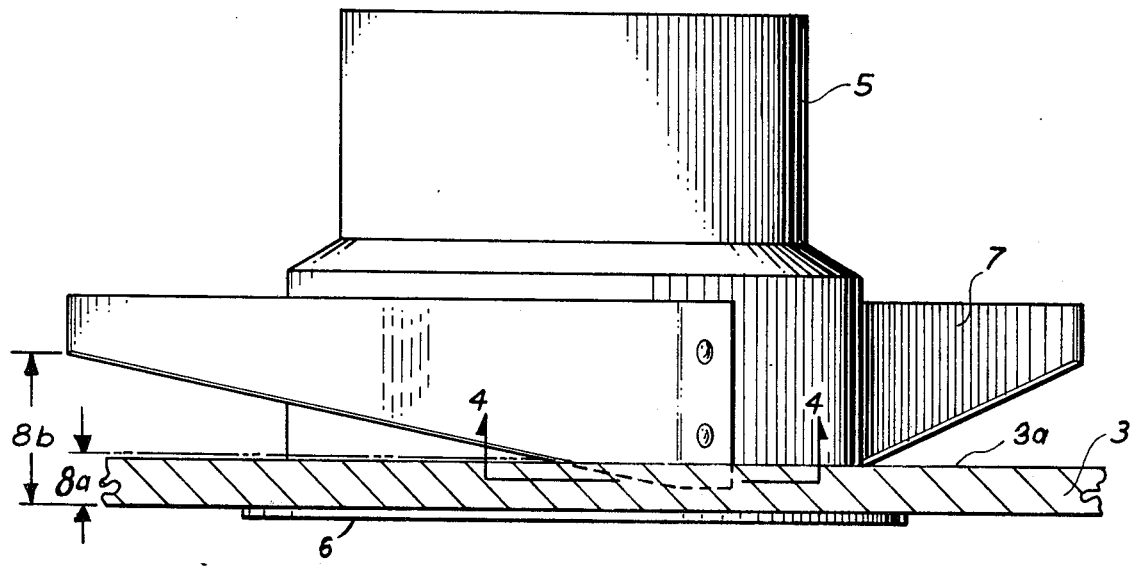
FIG. 3 is a view of the piece in side elevation, showing the slab in cross-section.
Figure 4:
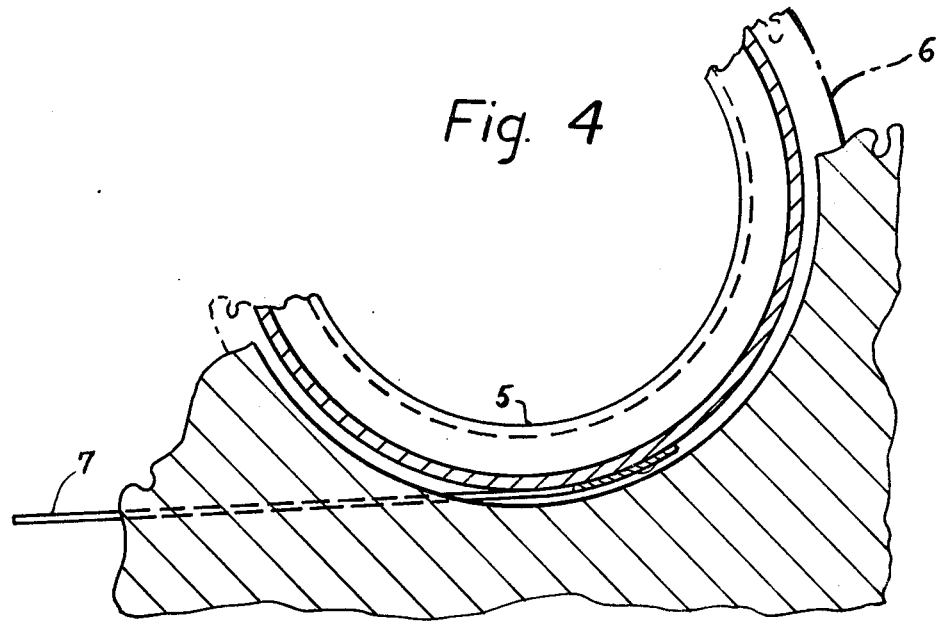
FIG. 4 is a fragmentary sectional view taken on line 4—4 of FIG. 3.

In the Figures, 5 designates a connecting piece in the form of a cylindric pipe or shell, which is detachably secured in an opening 4 of a ceiling or wall slab 3. The rear side of the slab is designated by 3a. The connecting piece is provided with a stop member or shoulders abutting the front side of the slab. At the embodiment shown the stop member is a flange 6 with a circumference exceeding that of the connecting piece in general. Such a flange can possibly be provided with one or more screw holes 6a. 7 designates clamp means in the form of a plurality of elongated and narrow upright wings of a resilient material, for example sheet metal, which tangentially project from the shell surface of the connecting piece and are manufactured so thin, that upon the insertion of the connecting piece 5 into the opening, for example by a screwing motion, the wings can be caused to lie closely along the shell surface of the connecting piece. Each wing is so designed and attached to the connecting piece, that the distance or spacing between the ceiling or wall plane through the flange and the wing edge portion facing toward the flange 6 increases with the distance from the point of mounting. Hereby the wings 7 after their passage through the opening 4 with their edge lines facing toward the flange will be straightened due to their resilience to abut the plane 3a on the rear side of the opening 4. See FIG. 2 where 8a designates the distance adjacent the point of mounting of the wing 7 between the ceiling or wall plane through the flange 6 and the wing portion facing toward the flange. The corresponding greater distance farther outward from the point of mounting is designated in FIG. 2 by 8b. Due to the greater or smaller outward spring action of each wing, depending on the thickness of the slab 3, the connecting piece can rapidly and safely be secured in ceiling or wall slabs of different thicknesses. In the Figures an embodiment is shown, at which the wings are manufactured as substantially triangular upright tongues, which at the base of the triangle are attached to the shell surface of the connecting piece. After the positioning of the connecting piece a valve 1 has been mounted at the front side of the connecting piece and a passage 2 has been connected to the rear side of the connecting piece.

The invention, of course, is not restricted to a definite embodiment of the wings. The insertion of the wings into the opening can be facilitated thereby that the wings temporarily are brought to abut the shell surface of the connecting piece by means of an adhesive tape or a strip.

I claim:

1. A connecting piece for mounting a ventilation element in an opening in a ceiling or wall slab, said connecting piece comprising a cylindric shell having stop means extending outward in a common radial plane on the front side to abut the front surface of the slab surrounding said opening, and clamp means cooperating with the stop means to secure the connecting piece in the opening, characterized in that the clamp means comprises a plurality of elongated wings of a resilient flexible material, mounted at one end on the outer surface of said shell and normally tangentially projecting outwardly from the shell outer surface so that upon the insertion of the connecting piece into the opening, the wings may be flexed inwardly to lie circumferentially along the shell surface, each wing having a front edge portion facing toward the stop means with a spacing from said common radial plane which increases with the distance from the point of mounting, whereby the wings after their passage through the opening due to their resilience will be straightened so that the front edge portions abut the rear surface of the slab surrounding the opening and thereby together with the stop means secure the connecting piece on ceiling or wall slabs of different thicknesses.

2. A connecting piece according to claim 1, characterized in that the wings are substantially triangular tongues of sheet metal, the base of the triangle being attached to the outer shell surface along a line parallel to the axis of the cylindric shell.

3. A connecting piece according to claim 1 wherein said cylindric shell of said connecting piece has a tubular portion operable to connect with a ventilation passage at its rear end and means for mounting a valve at its front end.

4. A connecting piece according to claim 1 wherein said stop means comprises a continuous flange extending radially outward from said cylindric shell at its front end.

5. A connecting piece according to claim 4 wherein said elongated wings comprise thin, narrow elements of sheet metal disposed when straightened perpendicular to the plane of the flange whereby the front edge of said wing element diverges from said flange in a direction extending from said cylindric shell.

6. A connecting piece according to claim 5 wherein said metallic wings all extend tangentially from said shell in a clockwise direction so that they may be displaced to lie circumferentially along the shell by rotating said connector about the axis of said cylindric shell and displacing said shell axially.

7. A connecting piece for mounting a ventilation element in an opening in a ceiling or wall slab, said connecting piece comprising a cylindric shell having stop means disposed around the periphery of the front side to abut the outer surface of the slab, said stop means extending radially outward in a common plane from said cylindric shell, and clamp means cooperating with the stop means to secure the connecting piece in the opening, characterized in that the clamp means comprises a plurality of thin, narrow wings of sheet metal connected to the outer surface of said shell and projecting, when straightened, perpendicular to said common plane of said radially-projecting stop means and tangential to the outer shell surface, said wings being flexible and resilient so that upon insertion of the connecting piece into the opening, the wings may be flexed to lie circumferentially along the shell surface to pass through the opening, the wings after their passage through the opening due to their resillience being straightened out with front edges facing toward the rear surface of said slab surrounding said opening, said edges being spaced from the common plane of said stop means with a spacing which increases with the distance from the point of connection of said wings to the outer cylindric surface of said shell, whereby the front edge portions may abut the rear surface of the slab surrounding the opening and thereby, together with the stop means, secure the connecting piece in slabs of different thicknesses.

8. A connecting piece according to claim 7 wherein said wings are three in number and are mounted at equally spaced points around the circumference of said shell.

* * * * *